US011063957B2

(12) United States Patent
Blöcher et al.

(10) Patent No.: US 11,063,957 B2
(45) Date of Patent: Jul. 13, 2021

(54) METHOD AND ARRANGEMENT FOR DECOUPLED TRANSMISSION OF DATA BETWEEN NETWORKS

(71) Applicant: SIEMENS AKTIENGESELLSCHAFT, Munich (DE)

(72) Inventors: Uwe Blöcher, Puchheim (DE); Rainer Falk, Poing (DE); Jens Reinert, Wolfenbüttel (DE); Martin Wimmer, Neubiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 71 days.

(21) Appl. No.: 15/742,930

(22) PCT Filed: Jun. 27, 2016

(86) PCT No.: PCT/EP2016/064783
§ 371 (c)(1),
(2) Date: Jan. 9, 2018

(87) PCT Pub. No.: WO2017/021060
PCT Pub. Date: Feb. 9, 2017

(65) Prior Publication Data
US 2018/0375876 A1    Dec. 27, 2018

(30) Foreign Application Priority Data
Aug. 6, 2015  (DE) .................. 10 2015 214 993.5

(51) Int. Cl.
*G06F 21/00*  (2013.01)
*H04L 29/06*  (2006.01)

(52) U.S. Cl.
CPC ............ *H04L 63/105* (2013.01); *H04L 63/02* (2013.01); *H04L 63/20* (2013.01)

(58) Field of Classification Search
CPC ....... H04L 63/105; H04L 63/02; H04L 63/20; H04L 65/80; H04L 43/00; H04L 67/025; H04L 67/28; H04L 69/22
(Continued)

(56) References Cited

U.S. PATENT DOCUMENTS 6,453,345 B2 *  9/2002  Trcka .................... G06F 21/552
                                                              709/223
8,068,415 B2    11/2011  Mraz
(Continued)

FOREIGN PATENT DOCUMENTS

CN    104410623 A    3/2015
CN    107409139 A    11/2017
(Continued)

OTHER PUBLICATIONS

PCT International Search Report corresponding to PCT International Application No. PCT/EP2016/064783 filed Jun. 27, 2016.

*Primary Examiner* — Josnel Jeudy
(74) *Attorney, Agent, or Firm* — Schmeiser, Olsen & Watts LLP

(57) ABSTRACT

Provided is a method for decoupled transmission of data between networks having different security requirements, in which, in a first network having high security requirements, first data from a first application are transmitted in a communication exclusively between components within the first network via multiple communication links, data being captured in the first network by at least one monitoring device per communication link in a decoupled manner and being (Continued)

transmitted to a second network having lower security requirements. Also, a corresponding arrangement is also provided.

18 Claims, 3 Drawing Sheets

(58) Field of Classification Search
USPC .......................................................... 726/27
See application file for complete search history.

(56) References Cited

U.S. PATENT DOCUMENTS

| | | | |
|---|---|---|---|
| 8,959,045 B2 | 2/2015 | Patten | |
| 2004/0268151 A1* | 12/2004 | Matsuda | G06F 21/6218 726/11 |
| 2005/0129033 A1 | 6/2005 | Gallatin et al. | |
| 2009/0002150 A1* | 1/2009 | Zilberstein | G05B 23/0208 340/531 |
| 2010/0162399 A1 | 6/2010 | Cama et al. | |
| 2011/0150220 A1* | 6/2011 | Breton | H04L 63/0209 380/255 |
| 2012/0291089 A1 | 11/2012 | Bomgardner | |
| 2015/0007316 A1* | 1/2015 | Ben-Shalom | H04L 63/12 726/23 |
| 2015/0215075 A1* | 7/2015 | Baek | H04L 1/1607 726/4 |
| 2016/0295410 A1* | 10/2016 | Gupta | H04L 63/1441 |
| 2018/0124121 A1 | 5/2018 | Blocher et al. | |
| 2019/0149557 A1 | 5/2019 | Falk | |

FOREIGN PATENT DOCUMENTS

| | | |
|---|---|---|
| DE | 102014226398 A1 | 6/2016 |
| WO | 2016156063 A1 | 10/2016 |
| WO | 2017190997 A1 | 11/2017 |

* cited by examiner

METHOD AND ARRANGEMENT FOR DECOUPLED TRANSMISSION OF DATA BETWEEN NETWORKS

CROSS-REFERENCE TO RELATED APPLICATIONS

This application claims priority to PCT Application No. PCT/EP2016/064783, having a filing date of Jun. 27, 2016, based on German Application No. 10 2015 214 993.5, having a filing date of Aug. 6, 2015, the entire contents both of which are hereby incorporated by reference.

FIELD OF TECHNOLOGY

The following relates to a method and an arrangement for decoupled transmission of data between networks with different security requirements, for example between industrial control networks and less critical diagnosis networks.

BACKGROUND

Security solutions for the transmission of data between networks with different security requirements, what are known as cross-domain security solutions, have been used in specific areas to date, such as e.g. official communication, in which high security requirements are in force and in which there is security classification of documents and information. A cross-domain solution realizes automated secure exchange of documents and messages, such as e.g. emails, between zones with different levels of security requirements. An essential component in this case is a data diode, which ensures unidirectionality of the data communication, that is to say transport of data, just in one direction.

To couple industrial control networks, which usually have high security requirements, to a diagnosis network, an office network or a public internet, which usually meet only low security requirements, conventional firewalls have been used to date, which filter the data communication according to configurable filter rules. In this case, the data communication is permitted or blocked on the basis of the addresses of the communication partners and the communication protocol used, for example. The security requirements relate particularly to the availability and the integrity of the data transmission. This is a different objective than protection of confidentiality, as is frequently required for office applications or official applications.

U.S. Pat. No. 8,068,415 B2 discloses a data diode consisting of a transmission component and a reception component that are connected to an optical transmission line or shielded twisted copper lines, which thereby realize unidirectional data transmission. The transmission component in this case is a proxy that is introduced into the data communication. Such a transmission component cannot reliably ensure decoupled data transmission. Moreover, such a transmission component is located in the communication path of the safety-critical network, which means that an end-to-end communication between network components is interrupted.

A data transmission between two networks is decoupled if, during or as a result of the data transmission, no signals or data are introduced into the sending network or data in the first network can be altered. In this case, the decoupling is meant to be ensured not only in respect of signals being introduced or changed by an external communication subscriber, the solution itself is meant to be decoupled. Known data diodes that realize a limited return channel e.g. for the acknowledgement of TCP packets therefore cannot be considered to be decoupled. Data diode solutions that require a specific transmission component that needs to be introduced into the communication path are also not suitable.

Such data diodes therefore do not guarantee decoupling and do not fulfil the required Q factor, as are demanded for the licensing of industrial control networks, for example.

Moreover, such a data diode is not suitable for high-availability networks, for example with redundant transmission paths or ring topologies, since a central transmission component is a break in the redundancy of the network and would require multiple data diodes, which are expensive and sophisticated to set up.

SUMMARY

An aspect relates to a solution for decoupled data transmission between networks, particularly with different security requirements and high availability, in a simple and inexpensive fashion.

In the method according to embodiments of the invention for decoupled transmission of data between networks with different security requirements, first data are transmitted in a first network with high security requirements by a first application in a communication exclusively between components within the first network via multiple transmission lines, wherein data are captured in decoupled fashion in the first network by at least one monitoring device per transmission line, and are transmitted to a second network with lower security requirements.

The first data of a first application in the first network are thus transmitted exclusively between components within the first network and are therefore an end-to-end communication. This end-to-end communication is not broken in embodiments of the present invention, since the communication is merely monitored, but is not broken by a separate component that does not belong to the first network. This reliably ensures decoupling, i.e. it is certain that no kind of new data are distributed to the first network by the transmission in a second network. Likewise, no data within the first network are altered and no data are added to the first network, since the monitoring of data merely comprises copying and transmitting the copied data or data packets to a second network. The data packets or data are not evaluated in the monitoring device in this case. The capture of the first data by a monitoring unit is a function that is absolutely transparent for the communication in the first network.

The use of at least one monitoring unit per communication link ensures that, in a first network of redundant design, even if one of the communication links fails, the first data can be reliably captured by the remaining communication links. If data are transmitted via multiple communication links either at the same time or alternately, then in this case too at least one respective monitoring unit per communication link ensures that all the data are captured. From the capture of the data on different communication links, it is also possible for further information or plausibility checks to be derived. Even in the case of a bidirectional communication between the components of a first network via different communication links, capture of the data in both directions is ensured.

The method is likewise suitable for tapping off realtime-critical communication, since the copying of the first data can be performed without significant delay. As a result, it is possible for realtime-relevant information, e.g. for realtime-critical control or regulation of an automation system, to be tapped off and evaluated in decoupled fashion.

A first application is a diagnosis function, for example, in which diagnosis messages are transmitted within a control network or a segment of the control network by a component of the control network to a component configured as a diagnosis server within the control network. A second application may be the control function, for example, in which control messages, for example for a train protection network, are likewise transmitted between the components of the first network. The monitoring device is not an additional transmission component that is channeled into the communication as a proxy, for example. Merely data that are transmitted anyway are monitored passively. There is therefore also no additional component for explicitly sending data from the second network to the first network.

In one advantageous embodiment, a second data of a second application are transmitted between components within the second network, wherein the data are captured in the second network by at least one second monitoring device and are transmitted to the first network. In the first network, a reconstructed communication of the second application is created from the captured data and, merely in the event of successful reconstruction, second data are transmitted to components of the first network. Thus, two monitoring devices are combined, which work autonomously in each case, however. A first realizes decoupled one-way communication from the first network to the second network, as described previously. A second realizes a controlled return channel. In this case, the first monitoring device continues to be decoupled, as described above. The second component can admittedly channel in a communication in the first network, but without there being a network connection from the second network to the first network. This reliably prevents the communication in the first network from being influenced by a communication in the second network.

This allows instructions to or configuration changes for the first application in the first network to be transmitted from the second network to the first network. Therefore, amended diagnosis schedules or amended diagnosis queries can be introduced with a high level of security against data manipulation, for example. Influencing of the security-relevant network by the transmission of the second data is minimized, since only a controlled communication is used in the first network, which involves the monitored useful data of the second network being used in order to form a data communication in the first network and to channel said data communication into the first network. Since no direct network communication from the second network to the first network takes place, but rather a data communication is formed within the first network, influencing of the data transmission in the first network is reliably prevented. The formation and sending of the data packets of the monitored useful data of the second network are in this case effected by a component of the first network, which means that influencing of the data transmission of the first network by the second network is prevented as a matter of principle.

In one advantageous embodiment, all the captured data are stored in a data memory unit in unfiltered fashion.

This particularly allows fast capture of data of a realtime-relevant first or second application.

In one advantageous embodiment, the first data are filtered by a filter unit in the second network and the second data are filtered by a filter unit in the first network.

This results in an early reduction in the data volume and facilitates post-processing of the captured data.

In one advantageous embodiment, the first and second data of the first and second applications are filtered by evaluation of the captured data with regard to an application-specific identifier.

If the diagnosis data are transmitted on a logically separated diagnosis network of the first network, for example, then applicable diagnosis data are denoted and separable by an applicable diagnosis network identifier, e.g. a VLAN tag. It is therefore possible for the data of interest—in this case diagnosis data—of a first application to be reliably filtered from the entire captured data stream.

In one advantageous embodiment, a reconstructed communication of the first and second applications is created in the second and first networks from the first and second data in a reconstruction unit.

This has the advantage that there is a high level of certainty of only the desired first and second data of the desired first and second applications being discerned. The reconstruction of the communication allows data erroneously filtered as belonging to the first or second application to be identified and eliminated. This also allows a fault or manipulation of the first or second application to be identified.

In one advantageous embodiment, the communication of the first and second applications is reconstructed by using only response data packets explicitly belonging to a request message.

In a further advantageous embodiment, merely the response data packets that are received in a prescribed interval of time after a request message are used for reconstruction.

This allows data packets introduced by manipulation in the first network, for example, to be discerned and rejected as invalid and not to be used for reconstruction.

In one advantageous embodiment, the first data and the second data are stored in a data server and transmitted by an external command, at the request of components of the second and first networks or on initiation by the data server itself, to components of the second and first networks.

This firstly allows delayed transmission or introduction of the first and second data into the second and first networks. It is therefore possible, as one option, for temporally controlled transmission of the data to the respective other network to be realized. This also means that it is possible to ensure that only when data have been transmitted to the respective other network completely are these data installed in components of the network itself. In one advantageous embodiment, all the captured data are stored in a data memory unit in unfiltered fashion.

Advantageously, a transmission instant for the captured data is recorded in this case and the transmission instant is stored together with the captured data, particularly in digitally signed fashion.

This allows simple logging of the one-way communication. If the captured data and the transmission instant are stored in digitally signed fashion, a subsequent change in the data can be detected.

The arrangement according to embodiments of the invention for decoupled transmission of data between networks with different security requirements, wherein first data are transmitted in a first network with high security requirements by a first application in a communication exclusively between components within the first network via multiple communication links, comprises at least one monitoring device per communication link that is configured to capture data in decoupled fashion in the first network from a respective communication link and to transmit said data to a second network with lower security requirements, and a data memory unit that is arranged in the second network and stores the captured data.

At least one monitoring unit per communication link is used to establish decoupled network monitoring or a side channel in order to capture data transmitted within a first security-relevant network. It is thus possible for the arrangement to be used particularly for security-relevant networks, such as control networks, in which security-relevant control communications are transmitted via the same physical infrastructure, such as diagnosis data, for example. The use of multiple monitoring components, particularly at least one respective monitoring component per communication link, means that the first data are reliably captured and transmitted to the other network even if a communication link fails. If the multiple communication links are used for different partial volumes of data, such as signaling messages and useful data, for example, of the first application, then all the partial volumes of data can be reliably captured.

If the first network has a ring topology, then, by way of example, a monitoring device is arranged at two locations, for example upstream and downstream of a diagnosis server, or on each redundancy segment when there are redundant transmission paths. The arrangement is therefore suitable for high-availability networks, for example security networks.

In an advantageous variant, in which second data of a second application are transmitted between components of the second network, the arrangement additionally comprises at least one second monitoring device that is configured to capture data in the second network and to transmit said data to the first network, and a second reconstruction unit that is configured to create a reconstructed communication of the second application from the captured data and, merely in the event of successful reconstruction, to transmit second data to components of the first network.

The passive monitoring of the communication in the second network means that no dedicated transmission or reception component is needed for the data transmission between the networks. Influencing of the first network by the data transmission is therefore minimized. In one advantageous embodiment, the first and second monitoring units are in the form of a network output coupler, for example a network tap, or in the form of a device having a network interface to the first network, the contacts of which are configured to be deactivated for transmission signals, or in the form of an output coupling device for electromagnetic emitted radiation.

All the cited forms of a monitoring unit capture the data on the communication link on which they are arranged in a passive manner. That is to say that merely data or signals are captured without a way of introducing even data into the communication link. This also encompasses forwarding of altered signals and data within the respective network as well. Such monitoring devices are available and inexpensively accessible. A copy of the signals and data is thus achieved in a simple manner and therefore a break in protocol is prevented or protocol independence is achieved.

In one advantageous embodiment, the arrangement comprises a data memory unit that is configured to store all the captured data in unfiltered fashion.

In one advantageous embodiment, the arrangement additionally comprises a filter unit that is configured to filter the first data and the second data from all the captured data. Moreover, the arrangement additionally comprises a reconstruction unit that is configured to reconstruct the communication of the first application by only using response data packets explicitly belonging to a request message for evaluation.

Therefore, the captured volume of data is reduced and, by way of example, is reduced to the communication of one particular application.

In one advantageous embodiment, the arrangement additionally comprises a data server that is configured to store the reconstructed first and second data.

This allows temporal control of the transmission of data to the respective receiving network to be performed. Secondly, progressively intercepted data can be collected and, in the event of complete availability, transmitted to the receiving network in collected fashion. The data server may in this case be set up to transmit the data to the receiving network by means of an external command, at the request of components of the receiving network or on initiation by the data server itself.

A computer program product (non-transitory computer readable storage medium having instructions, which when executed by a processor, perform actions) according to embodiments of the invention, which is directly loadable into a memory of a digital computer, comprises program code parts that are suitable for performing the steps of the method described.

BRIEF DESCRIPTION

Some of the embodiments will be described in detail, with references to the following Figures, wherein like designations denote like members, wherein.

Figure 3:
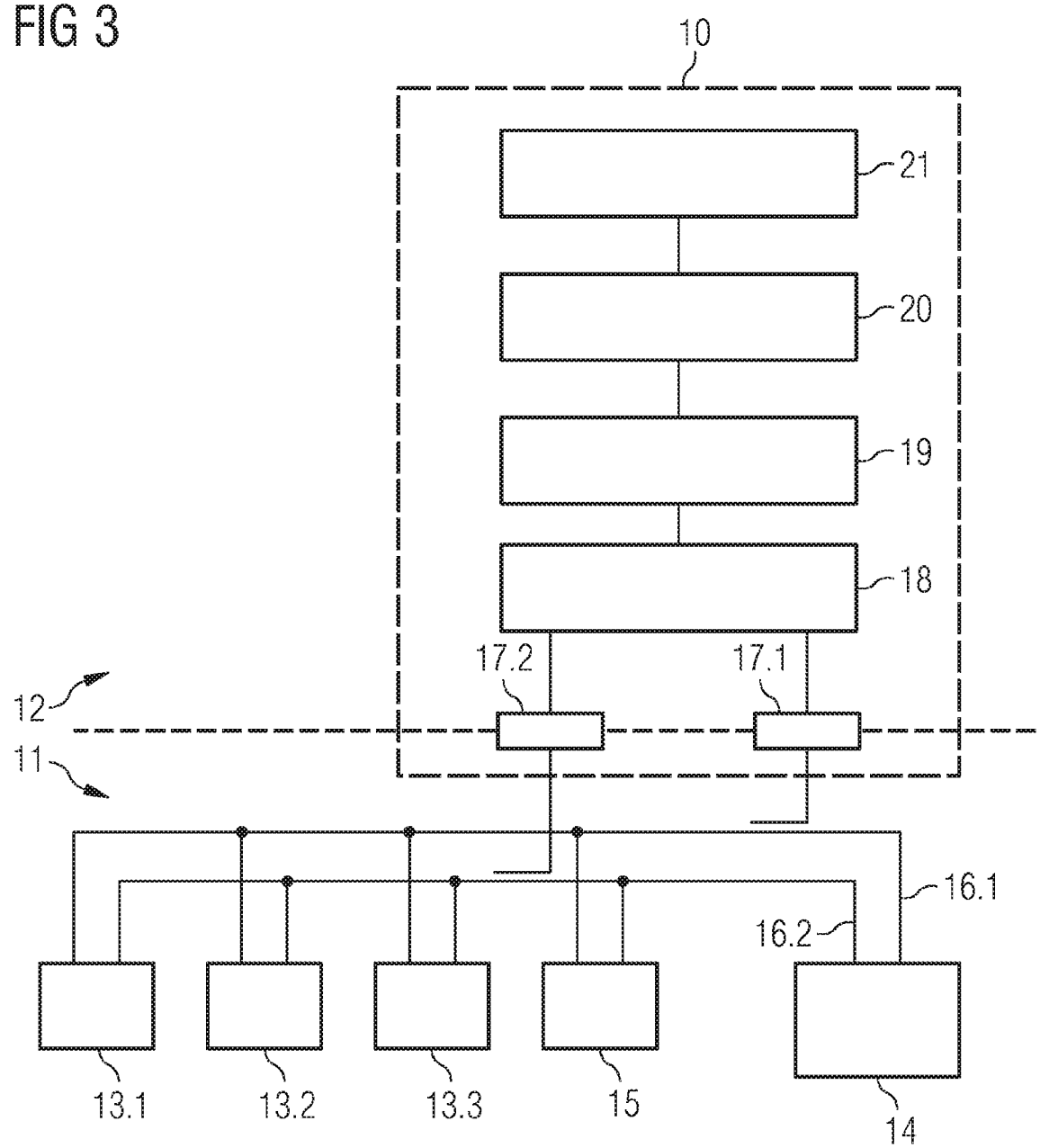
Figure 4:
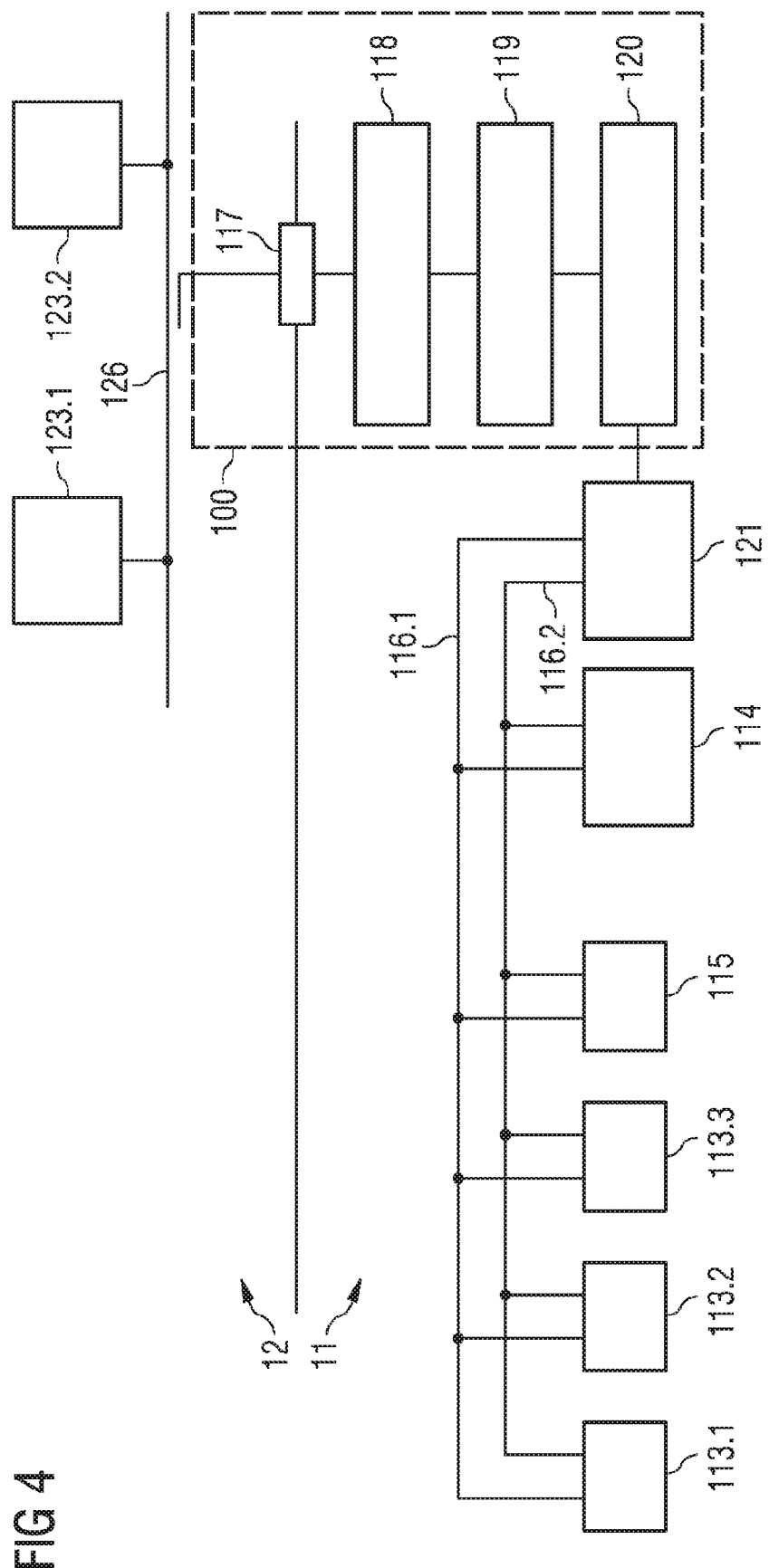

FIG. 3 shows a first exemplary arrangement according to embodiments of the invention for transmitting data from a security-critical first network to a less security-critical second network with an embodiment of a monitoring unit according to embodiments of the invention in a schematic depiction; and FIG. 4 shows a second exemplary arrangement according to embodiments of the invention for transmitting data from a less security-critical second network to a security-critical first network in a schematic depiction.

DETAILED DESCRIPTION

Mutually corresponding parts are provided with the same reference symbols throughout the figures.

Decoupled transmission of data between networks is necessary particularly when different security requirements exist for the networks involved. Networks with high security requirements are a control network or in an automation installation, for example, by means of which production components are connected to one another and controlled, for example. Similar requirements also exist in control networks for train protection networks or power distribution installations, for example. Security-critical networks of this kind are for the most part closed or at least access-controlled control networks with bidirectional communication between individual components, such as field devices and control computers, diagnosis computers or surveillance computers, for example. The communication is frequently realtime-critical and/or security-critical. End-to-end communication exists within the control network.

In order to ensure a high level of availability in control networks, the communication network is usually equipped with redundant communication links or transmission paths, such as e.g. a dual bus system or a ring topology. It is also possible for multiple communication links to be used depending on the network load. Frequently, the same communication links are used to transmit data of different applications, such as for control or for diagnosis of the components, and merely virtual separation, for example by separate VLANs, is implemented. Diagnosis data are transmitted by components, for example, such as field devices, to a diagnosis server within the closed control network.

By contrast, the evaluation of the diagnosis data is usually performed not in this closed control network but rather in an office network with lower security requirements. In order now to be able to perform a transmission of first data of a first application, in this case diagnosis data of a diagnosis application, for example, to a second, less security-critical, network, in this case the office network, without influencing the first network, the following steps are performed:

The first method step 1 is the transmission of first data of a first application in the first network. In the second method step 2, the first data are captured by at least one monitoring unit per communication link in the first network and duplicated. In method step 3, the duplicated data are transmitted from the monitoring device to a second network.

In this case, the monitoring unit merely taps off the first data from the communication link, i.e. copies the data and routes the copied data to the second network. The first data are not altered in the first network in this case, but rather are forwarded to the communication partner in the first network without delay. The monitoring is not detectable in the first network. No kind of additional data are introduced into the first network by the monitoring unit, nor generated during the duplication. Similarly, alteration of the data forwarded within the first network is precluded. The monitoring is therefore a transparent action, passive vis-à-vis the first data, in the first network.

There is no additional transmission component that could alter or delay the communication. Therefore, the method is particularly suitable for realtime-relevant communication. The use of at least one monitoring device per communication link ensures that all the transmitted first data of the communication are captured even if a communication link fails or if a transmission changes over time between the communication links. If the first network is designed using ring topology, then each of the two communication links in proximity to the diagnosis server, for example, is monitored.

Figure 1:
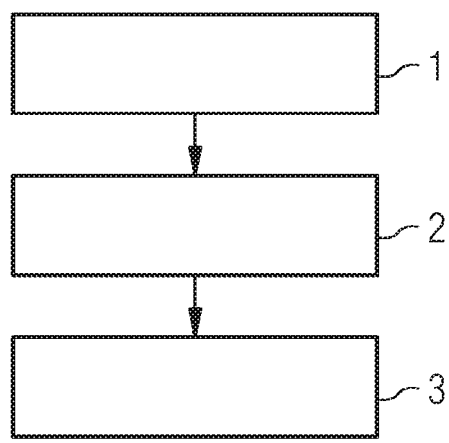
FIG. 1 shows a flowchart of a first exemplary method according to embodiments of the invention.
Figure 2:
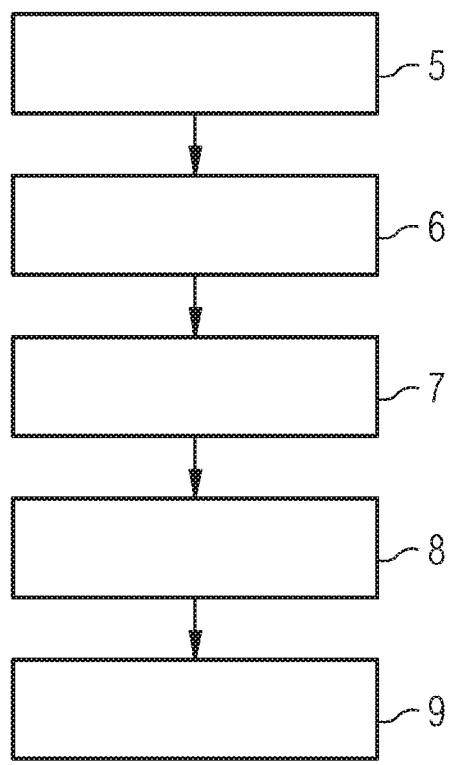
FIG. 2 shows a flowchart of a second exemplary method according to embodiments of the invention.

FIG. 2 shows a further embodiment of the method, in which, in addition to the communication from the first to the second network, a communication from the second network with lower security requirements to the first security-critical network is also depicted.

In method step 5, second data of a second application are transmitted between components within the second, less security-critical, network. These may be configuration data or software, for example, that are meant to be made available to the first network by the second network. In this case too, it is necessary to ensure that the filling of a data or loading server in the first network, for example, cannot influence the control communication. In method step 6, to this end, data are captured in the second network by at least one second monitoring device, and are transmitted in method step 7 to the first network. In method step 8, a reconstructed communication of the second application is now created from the captured data, and is transmitted in method step 9 to the first network only if the second data have been reconstructed successfully.

The data transmitted to the second network are stored in a data memory unit. Subsequently, the first data can be filtered from all the captured data by a filter unit in the second network. Accordingly, filtering of the second data is possible after the transmission in the first network. To this end, a VLAN tag or other application identifier, for example, in the data packets can be evaluated. Subsequently, the communication of the first and second applications can be reconstructed from the filtered first and second data. This makes it possible to ensure that captured data can be associated with the correct application and, by way of example, an erroneous communication within the first and second applications can be registered. It is then possible for measures to be derived therefrom, for example a warning or omission of the applicable data. This can be optimized further if captured data packets can be explicitly associated with a request message. Moreover, it is possible for the time of reception of a response data packet following a request message to be limited to a prescribed interval of time and for only data packets within this prescribed interval of time to be used for reconstruction.

The data transmitted to the second and first networks can also be stored in unfiltered fashion and used for surveillance of the first network. To this end, a transmission instant for the captured data is advantageously recorded. The captured data and the transmission instant are advantageously stored in digitally signed fashion. It is thus possible for any manipulation of the data to be spotted and for an evaluation to be restricted to the data with a correct digital signature. From this, it is possible to infer possible manipulation of the data.

FIG. 3 now shows an arrangement 10 for transmitting first data from the first network 11 with high security requirements to a second network 12 with lower security requirements. In this case, multiple components 13.1, 13.2, 13.3, such as field devices, for example, and a control computer 15 and also a diagnosis server 14 are connected to one another via a redundant first network. The redundant network is in this case depicted as a dual bus with communication links 16.1, 16.2, for example. Each component 13.1, 13.2, 13.3, 14, 15 is connected to a respective network interface by means of one of the two communication links 16.1, 16.2. In this case, the communication links 16.1, 16.2 are used to transmit realtime-critical, safety-critical measurement data and control data. Any network components present, such as switches or hubs, are not depicted. The network protocol used is the Internet Protocol according to version 4 or version 6, for example. The network infrastructure is used to transmit not only the highly security-critical control data but also diagnosis data. These can be transmitted e.g. by means of a protocol of a standardized unified architecture of an open platform communication, OPC UA protocol, a simple network management protocol, SNMP or, by way of example, a syslog protocol.

The aim is now to transmit first data, in this case the diagnosis data, for example, to the second network 12 in decoupled fashion for the first network 11 and while maintaining the integrity of the data. The first data are then evaluated in said second network. To this end, at least one monitoring device 17.1, 17.2 of the arrangement 10 is respectively associated with one of the redundant communication links 16.1, 16.2. The two monitoring devices 17.1, 17.2, independently of one another, capture the respective data transmitted on the first and second communication links

16.1, 16.2, create a copy of the data, which are then transmitted to the second network 12 to a data memory unit 18 and stored therein. The data memory unit 18 of the arrangement 10 can additionally record the time of the transmission of the first data to the second network 12 and store it as logging data, for example with a digital signature computed using data and time.

The monitoring devices 17.1, 17.2 are purely passive network components. A monitoring unit may, by way of example, be configured as a network output coupler that copies the data packets, or an output coupling device that detects electromagnetic fields emitted by the communication line and converts them into signals and data.

The data memory unit 18 can be used to store and particularly archive the data captured from the first network in unfiltered and reconstructed fashion for monitoring purposes. The digital signature allows subsequent manipulation to be discerned, so that data transmissions are checkable and verifiable. This is advantageous particularly for security-relevant networks that require licensing.

Filtering of the first data by the filter unit 19 of the arrangement 10 is possible using VLAN tags at transmission level, an application-specific identifier at transport level or, above that, protocol level, for example. First data that exist redundantly can be compared in a reconstruction unit 20 and just one of the data packets can be used for the reconstruction. In the reconstruction unit 20, the communication of the first application is reconstructed, for example by just such first data as are associable with a request message being captured, or, additionally, there being a temporal correlation between request message and response data packet, corresponding to a prescribed interval of time, for example.

The first data are then provided in the form of a database or an XML file, for example, and stored in a data server 21 of the application 10. The first data are queryable and evaluable as a whole or in portions.

FIG. 4 now shows decoupled transmission of data from a second, less security-relevant, network to a security-critical first network 11. This is advantageous, by way of example, for the remote loading of software, firmware, configuration data or operating data, such as timetable data, which are meant to be made available within the security-critical first network 11. In this case too, it is necessary to ensure that the filling of a data server 121, in this case a loading server in the first network, for example, does not mean that the control communication in the first network 11 can be influenced.

The first network 11 comprises components 113.1, 113.2, 113.3 and a first application server 114, for example a diagnosis server, and also a second application server 115, for example a control server, and a data server 121. These network components are redundant, for example connected to one another via two respective network interfaces via a data bus having a dual layout, by means of communication links 116.1, 116.2. Additionally, the data server 121 is connected to a reconstruction unit 120 of the arrangement 100. In the second network 12, second data, such as software versions, firmware or configuration or operating data, for example, are transmitted from a provision client 123.1 to an external "dummy" loading server 123.2 via a communication link 126.

The arrangement 100 comprises a monitoring unit 117 that duplicates the second data during the transmission on the communication link 126 in the second network 12 and transmits them to a data memory unit 118 of the arrangement 100. The arrangement 100 moreover comprises a filter unit 119 and also a reconstruction unit 120 in accordance with the arrangement 10. The data memory unit 118 can be used, as in the case of the arrangement 10, to store the captured data in unfiltered fashion and to archive them together with a transmission instant, for example for surveillance purposes. The filter unit 119 is configured to filter the second data from the data captured by the monitoring unit 117.1, 117.2 and to forward said second data to a reconstruction unit 120. The reconstruction unit 120 is configured to transmit the second data of a reconstructed communication of the second application to the loading server 121 in the first network 11 only after a successful reconstruction.

The arrangement 100 can be used for controlled roll-out of SW patches, for example. In this case, a validation unit is set up in the external loading server 123.2, for example. The provision client 123.1 uses the communication link 126 to send a start message to the loading server 123.2 and subsequently begins transmission of the second data to the loading server 123.2. Subsequently, the second data are checked by means of a virus search, on the basis of a positive list or by means of a signature check by the validation unit in the loading server 123.2, for example. After complete transmission of the data and a successfully completed check, the external loading server 123.2 sends an acknowledgement message to the provision client 123.1. The start message, the second data and the concluding acknowledgement message are transmitted via the monitoring unit 117 from the second network to the first network, where they are evaluated and reconstructed by the filter unit 119 and reconstruction unit 120. Only when the acknowledgement message can be received and can be associated with the start message in the reconstruction unit 120 are the reconstructed second data output to the data server 121 in the first network 11. The transmission of the second data from the loading server 121 to the components 113.1, 113.2, 113.3, 114, 115 of the first network 11 can be started manually by a service engineer. It is also possible for a separate start command to be transmitted using the loading mechanism according to embodiments of the invention, which starts the transmission of the second data, previously replicated on the data server 121, to the components 113.1, 113.2, 113.3, 114, 115 of the first network 11.

In the case of such transmission of such a loading mechanism from the second network 12 with low security requirements to the first security-critical network 11, reactions on the first network 11 can be minimized. Strict physical separation is also achieved in this case, which means that decoupling is guaranteed with a high degree of reliability. The data server 121 in the first network prevents direct and automatic installation of loaded data onto the components of the first network. A check on the second data to be loaded is performed in the second network by the external loading server 123.2, which means that no additional load therefor arises in the first network 11. Moreover, a fresh transmission of second data in the second network 12 becomes obsolete after a validation of the second data in the second network. This means that manipulation of the second data in the second network 12 is not possible.

The individual units of the arrangement 10, 100 may be configured in integrated form but also as physically separate units. The data server 121 depicted as a physically separate unit in FIG. 4 may be also be configured in a fashion integrated with the arrangement 100.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for decoupled transmission of data between networks with different security requirements, in which first data are transmitted in a first network with high security requirements by a first application in a communication exclusively between components within the first network via multiple communication links, the method comprising:
   capturing data in decoupled fashion in the first network by at least one monitoring device per communication link, wherein the at least one monitoring device is a one-way communication device and the monitoring performed by the at least one monitoring device is undetectable by the first network and wherein the at least one monitoring device captures the data in a passive manner; and
   transmitting the captured data to a second network with lower security requirements.

2. The method as claimed in claim 1, wherein second data of a second application are transmitted between components within the second network, further wherein:
   data are captured in the second network by at least one second monitoring device and are transmitted to the first network, and
   a reconstructed communication of the second application is created from the captured data and, in the event of successful reconstruction, second data are transmitted to components of the first network.

3. The method as claimed in claim 1, wherein all the captured data are stored in an unfiltered fashion in a data memory unit.

4. The method as claimed in claim 1, wherein
   the first data are filtered from all the captured data by a filter unit in the second network and the second data are filtered from all the captured data by a filter unit in the first network.

5. The method as claimed in claim 4, wherein the first data and the second data of the first application and the second application are identified and filtered by an application-specific identifier at a transport level.

6. The method as claimed in claim 4, wherein a reconstructed communication of the first application is created in the second network from the first data in a reconstruction unit and a reconstructed communication of the second application is created in the first network from the second data in a reconstruction unit.

7. The method as claimed in claim 6, wherein the communication of the first application and the second application is reconstructed by using only response data packets explicitly belonging to a request message.

8. The method as claimed in claim 6, wherein only the response data packets that are received in a prescribed interval of time after a request message are used for reconstruction.

9. The method as claimed in claim 1, wherein the first data are stored in a data server and the second data are stored in a data server and are transmitted by an external command, at the request of components of the second network and the first network or on initiation by the data server, from the data server to components of the second network and from the data server to components of the first network.

10. The method as claimed in claim 1, wherein a transmission instant for the captured data is recorded and the transmission instant is stored together with the captured data in digitally signed fashion.

11. A device for decoupled transmission of data between networks with different security requirements, wherein first data are transmitted in a first network with high security requirements by a first application in a communication exclusively between components within the first network via multiple communication links, the device comprising:
   at least one monitoring device per communication link that is configured to passively capture data in decoupled fashion in the first network from a respective communication link and to transmit the captured data to a second network with lower security requirements, wherein the at least one monitoring device is a one-way communication device, wherein the monitoring by the at least one monitoring device is undetectable by the first network; and
   a data memory unit that is arranged in the second network and stores the captured data.

12. The device as claimed in claim 11, wherein second data of a second application are transmitted between components of the second network, comprising:
   at least one second monitoring device that is configured to capture data in the second network and to transmit the captured data to the first network; and
   a reconstruction unit that is configured to create a reconstructed communication of the second application from the captured data and, in the event of successful reconstruction, to transmit second data to components of the first network.

13. The device as claimed in claim 11, wherein the at least one first monitoring unit and the at least one second monitoring unit are configured as:
   a network output coupler (tap),
   a device having a network interface to the first network, the contacts of which are deactivated for transmission signals, or
   an output coupling device for electromagnetic emitted radiation.

14. The device as claimed in claim 11, wherein the data memory unit is configured to store all the captured data in an unfiltered fashion.

15. The device as claimed in claim 11, further comprising a filter unit that is configured to filter the first data and the second data from all the captured data.

16. The device as claimed in claim 11, further comprising a reconstruction unit that is configured to reconstruct the communication of the first application by only using response data packets explicitly belonging to a request message for evaluation.

17. The device as claimed in claim 11, further comprising a data server that is configured to store the reconstructed first data and the reconstructed second data.

18. A computer program product, comprising a computer readable hardware storage device having computer readable program code stored therein, said program code executable by a processor of a computer system to implement the a method for decoupled transmission of data between networks with different security requirements, in which first data are transmitted in a first network with high security requirements by a first application in a communication exclusively between components within the first network via multiple communication links, the method comprising:
   capturing data in decoupled fashion in the first network by at least one monitoring device per communication link, wherein the at least one monitoring device is a one-way communication device and the monitoring performed by the at least one monitoring device is undetectable by the first network and wherein the at least one monitoring device captures the data in a passive manner; and
transmitting the captured data to a second network with lower security requirements.

* * * * *